Figure 1:
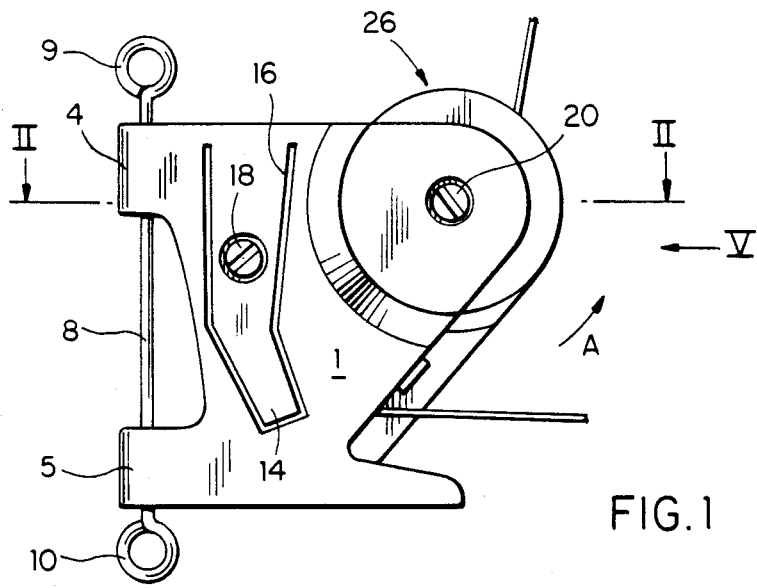

United States Patent [19]

Zaji

[11] Patent Number: 4,974,359
[45] Date of Patent: Dec. 4, 1990

[54] DEVICE FOR HOLDING A FISHING LINE

[76] Inventor: Alfred Zaji, Stritarjeva 6, Koper, Yugoslavia, 66000

[21] Appl. No.: 405,724

[22] Filed: Aug. 28, 1989

[51] Int. Cl.⁵ .......................................... A01K 95/00
[52] U.S. Cl. .................................... 43/27.4; 43/43.12
[58] Field of Search ............................. 43/274, 43.12

[56] References Cited

U.S. PATENT DOCUMENTS

| | | | |
|---|---|---|---|
| 3,930,330 | 1/1976 | Black | 43/43.12 |
| 4,069,611 | 1/1978 | Dusich | 43/43.12 |
| 4,417,414 | 11/1983 | Hood | 43/43.12 |
| 4,520,589 | 6/1985 | Lummis | 43/27.4 |
| 4,696,124 | 9/1987 | Wille | 43/27.4 |
| 4,698,933 | 10/1987 | Shaw | 43/43.12 |
| 4,700,505 | 10/1987 | Weber | 43/43.12 |
| 4,702,033 | 10/1987 | Shaw | 43/43.12 |
| 4,733,492 | 3/1988 | Thompson | 43/27.4 |
| 4,825,583 | 5/1989 | Kammeraad | 43/43.12 |
| 4,856,224 | 8/1989 | Fincher | 43/43.12 |

Primary Examiner—Kurt Rowan
Attorney, Agent, or Firm—Fleit, Jacobson, Cohn, Price, Holman & Stern

[57] ABSTRACT

The invention relates to a device for holding a fishing line, comprising a holding unity 26 arranged between bearing plates 1, 2, which comprises holding plates 27, 28 mutually connected by means of a fold 29. Each of the bearing plates 1, 2 comprises recesses 21, 22 formed as a circular segment, and the holding unity 26 comprises trapezoidal projections 32, 33 and 34, 35 arranged on the holding plates 27, 28. Thereby, the bearing plates 1, 2 and the holding plates 27, 28 are mutually connected in form-closed manner. The unity 26 is rotatable around a screw 20 towards the bearing plates 1, 2, whereby positioning of the fishing line between the holding pillows 36, 37 is enabled.

4 Claims, 2 Drawing Sheets

DEVICE FOR HOLDING A FISHING LINE

The invention generally relates to fishing and particularly to a device for holding a fishing line, comprising a pair of holding plates turned to each other and mutually movable, said plates being arranged in a casing.

A known device for holding fishing line is known from a prospectus of the company CANNON, USA. Said device is used in deep-sea fishing out of a boat, also known as a downrigger. At this kind of fishing a weight is fastened to the bearing line assuring a constant depth and in the area above the weight there is located said device fastened to the bearing line. The device comprises a fork-like casing whereby on the inner sides of the fork there is arranged a pair of immovable holding plates turned to each other and mutually movable by means of a fitting bolt. At fishing, the fishing rod is fixed in the boat and the fishing line is set in between the holding plates and then fastened with the fitting bolt; the line being fastened as a result. When a fish catches the bait it pulls the line from the grip of the holding plates and the angler can pull the fish to the surface. The malfunction of the said device lies in that it does not assure holding of the fishing line in an appropriate manner. This is particularly true when the holding plates are fastened too much or are insufficiently fastened. When fastened too much, the line does not release when a fish catches, and when the line is not fastened enough, it releases itself due to water resistance of the line when navigating slightly faster or due to waving of the sea.

With this specific problem in mind, it is a particular and primary object of the invention to provide a device for holding a fishing line of the general kind discussed in the foregoing, which, however, improves the construction further so as to prevent the fishing line pulling itself out due to water resistance and at the same time enabling immediate releasing of the fishing line at increasing resistance when fish catches.

According to the invention the given problem is solved by features presented in the characterising clause of the claim 1. Details of the solution according to the invention are given in Subclaims.

Figure 2:
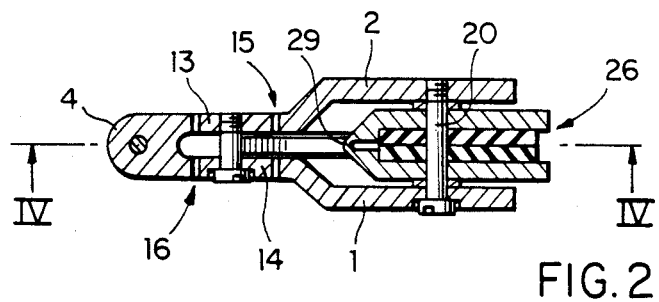
Figure 3:
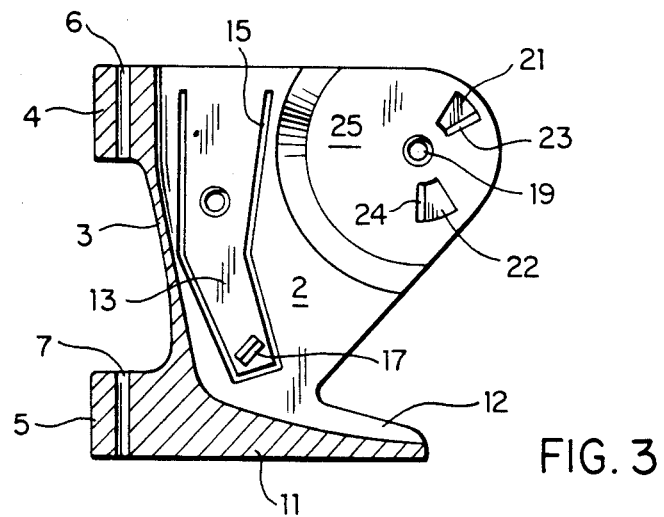
Figure 4:
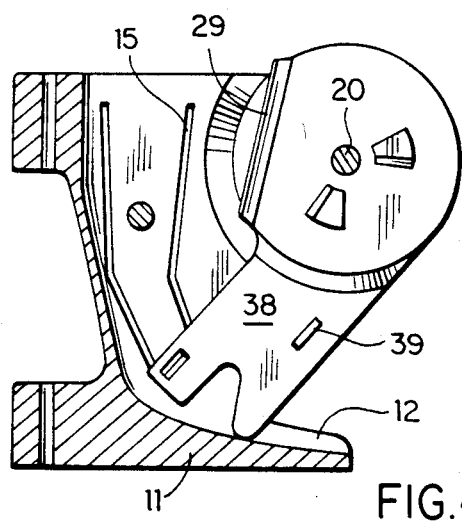
Figure 5:
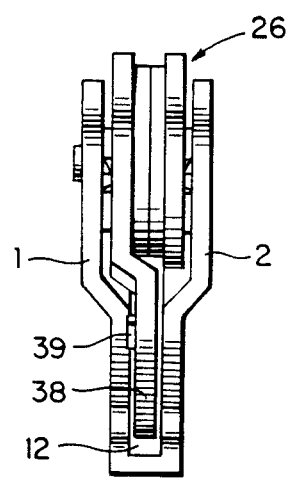
Figure 6:
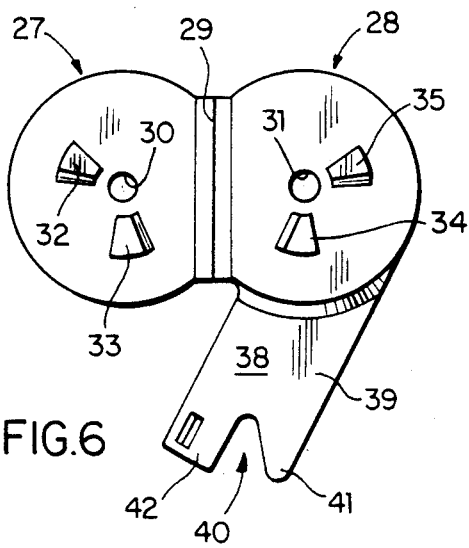
Figure 7:
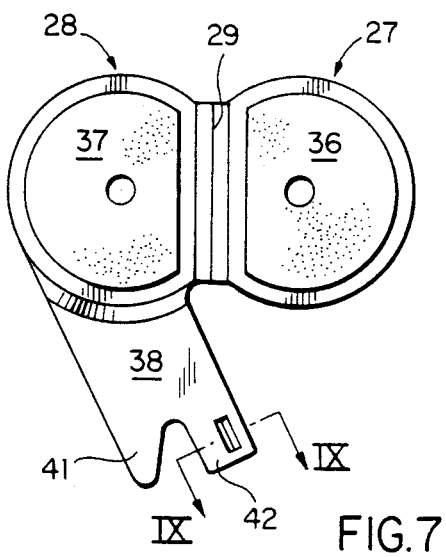
Figure 8:
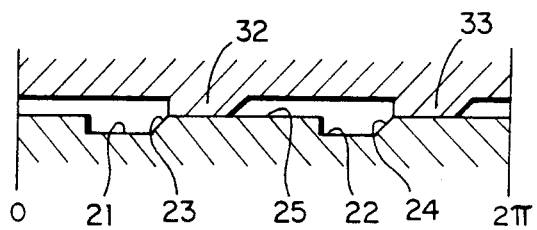
Figure 9:
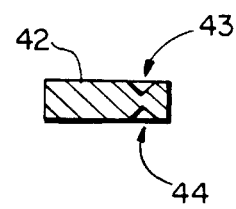

The invention will be further described in connection with the following detailed description of a preferred embodiment, reference being made to the accompanying drawings, in which FIG. 1 is a side elevation of a device according to the invention, FIG. 2 is a section according to line II—II of FIG. 1 of said device in holding position, FIG. 3 is a casing of said device, without front holding plate, FIG. 4 is a section according ot a line IV—IV of FIG. 2 of said device in holding position, FIG. 5 is an elevation of said device according to arrow V of FIG. 1, FIG. 6 is a side elevation of a holding unity of said device, FIG. 7 is an elevation of a holding unity of said device from the side opposite to that of FIG. 6, FIG. 8 is a detail of flattened curve plane in holding position, FIG. 9 is a section of a holding unity according to line IX—IX of FIG. 7.

According to the present invention, the device for holding a fishing line comprises a pair of essentially triangular bearing plates 1, 2 which are integral with a web 3 on the side of their hypotenuse. Said web has thickenings 4, 5 in its both corners, in which there are formed coaxial through-holes 6, 7 parallel to the said hypotenuse. A fastener 8 is introduced through the said holes which is provided with check eyes 9, 10 at its end lying above and under the thickenings 4, 5, respectively. The eye 9 is intended for fastening a bearing rope out of the boat while the eye 10 is intended for fastening a bearing rope of a weight (neither shown in FIG.). Perpendicularly to the connecting line of the holes 6, 7 there are the plates 1, 2 in the area of the thickenings 4, 5 integral with a wedge-shaped extension 11, in which there is formed a guide channel 12 between the plates 1, 2. A pair of tongue-holding clamps 13, 14 is formed in the bearing plates 1, 2 along the said hypotenuse and in the area of the web 3, respectively, said clamps stretching themselves from the area of the first side originating from the thickening 4 towards the area of the wedge-shaped extension 11 of the triangular bearing plates 1, 2. The tongue-holding clamps 13, 14 are integral with the bearing plates 1, 2 in the area along the said first side, they being separated from the bearing plates 1, 2 by means of splits 15, 16 on the remaining circumference. Each of the tongue-holding clamps 13, 14 at its end, lying in the area of the wedge-shaped extension 11, provided with a tooth 17. The clamps 13, 14 are mutually movable by means of a screw 18.

Triangular hearing plates 1, 2 are in their apex lying above the said hypotenuse provided with a through-hole 19, in which a tightening screw 20 is embedded. The sides of the bearing plates 1, 2 turned to each other, are provided with a pair of recesses 21, 22 each shaped as a circular segment, which are connected with a plane 25 of the bearing plate 1 and 2, respectively, by means of slopes 23, 24. In a clearance between the bearing plates 1, 2 there is a holding unity 26 attached pivotally around the screw 20; said holding unity is shown in FIG. 6. The latter comprises a pair of holding plates 27, 28, shaped as a circular segment, which are at a truncated end integrally interconnected by means of a fold 29. The holding plates 27, 28 are in their centre provided with through-holes 30, 31 round which there is on the first sides turned to the bearing plates 1, 2 in the given embodiment concentrically arranged a pair of trapezoidal projections 32, 33 and 34, 35 which fit to the recesses 21, 22 of the bearing plates 1, 2.

The sides of the holding plates 27, 28 turned to each other are in their plane provided with holding pillows 36, 37 each; said pillows are preferably of rubber. The holding plate 28 is integral with a holding attachment 38 having a backstop 39 on its outer side. The holding attachment 38 is at its free end by means of a notch 40 split up into a pair of legs 41, 42 whereby, seeing in a plane, the leg 42 is from its both sides provided with a recess 43, 44, having triangular shape in cross-section. (FIG. 9)

The device according to the present invention operates in the following manner.

By loosening the tightening screw 20 the bearing plates 1, 2 and the holding plates 27, 28 release themselves, therefore, the latter can be rotated into the direction of an arrow A until the trapezoidal projections 32, 33 and 34, 35 do not slide into the recesses 21, 22 of the bearing plates 1, 2. Thus, splaying of the holding plates 27, 28 and holding pillows 36, 37 thereby is enabled; a fishing line is set in between. The line is also led through the notch 40 between the legs 41, 42. Now, the holding unity 26 of the holding plates 27, 28 is to be rotated again, this time into the direction opposite to the arrow A, whereby the trapezoidal projections 32, 33 and 34, 35 slide out of the recesses 21, 22 over the slopes 23, 24 to the plane 25 of each bearing plate 1 and 2. Thus, the holding plates 27, 28 and each holding pillows 36, 37 come closer and the fishing line is fixed thereby. The guide channel 12 prevents the fishing line to slip out of the legs 41, 42.

The unity 26 turns towards wedge-shaped extension 11 until the backstop 39 lies onto the bearing plate 1, whereby further rotation of the unity 26 is disabled. In this position, the tooth 17 of each tongue-holding clamps 13, 14 jumps into the recesses 43, 44 of the holding attachment 38, whereby the unity 26 is blocked against rotation back into direction of the arrow A. Required force to pull the unity 26 out of the grip of the teeth 17 is controlled by mutual advancing and spreading of the tongue-holding clamps 13, 14 by means of the screw 18.

The holding plates 27, 28 and the holding pillows 36, 37 sustain the fishing line to such a degree that it does not slip out of the pillows 36, 37 due to constrain force in the water. When a fish catches, its pulling force acts through the line and through the holding attachment 38 onto the unity 26, which rotates into the direction of the arrow A due to torque around the body axis of the screw 20. Therefore, the projections 32, 33 and 34, 35 slide over the plane 25 into recesses 21, 22 whereby the holding force of the fishing line is reduced to such a rate that the line can slide from the grip of pillows 36, 37 of the holding plates 27, 28.

What is claimed is:

1. A device for holding a fishing line, comprisingf
a pair of bearing plates facing each other which are integral with a web wherein each bearing plate is provided with a pair of recesses formed as a circular segment, which are interconnected with a plane of each bearing plate over slopes; and
a holding unity having a pair of holding plates facing each other and mutually movable, wherein the holding unity is in between the bearing plates and is a form-closed manner connected to the bearing plates.

2. The device of claim 1, wherein the pair of holding plates are formed as a circular segment, which are mutually integrally connected by means of a fold whereby the holding plates have a pair of trapezoidal projections arranged concentrically on the holding plates on a side facing toward to the bearing plates, which fit into the recesses of the bearing plates.

3. The device of claim 1, wherein the holding plates are further provided with a holding pillow on the sides facing toward each other.

4. The device of claim 3, wherein the holding pillows are made of rubber.

* * * * *

UNITED STATES PATENT AND TRADEMARK OFFICE
CERTIFICATE OF CORRECTION

PATENT NO. : 4,974,359

DATED : December 4, 1990

INVENTOR(S) : Alfred Zajic

It is certified that error appears in the above-identified patent and that said Letters Patent is hereby corrected as shown below:

On the title page; Item (19) and (76)

inventor should read --Zajic--.

Signed and Sealed this

Second Day of June, 1992

*Attest:*

DOUGLAS B. COMER

*Attesting Officer*      Acting Commissioner of Patents and Trademarks